Sheet 1.
(116.)

2 Sheets

E. WOODWARD & N. J. MILLETT.

Improvement in Incubators.

No. 121,977.

Patented Dec. 19, 1871.

Witnesses:
James P. Gardner
Myron A. Poole

Inventors:
E. Woodward and N. J. Millett
by Alban Andrew their attorney.

Sheet 2.
(116.)
E. WOODWARD & N. J. MILLETT.
Improvement in Incubators.
No. 121,977.　　　*Fig. 3*　　　Patented Dec. 19, 1871.
2 Sheets.
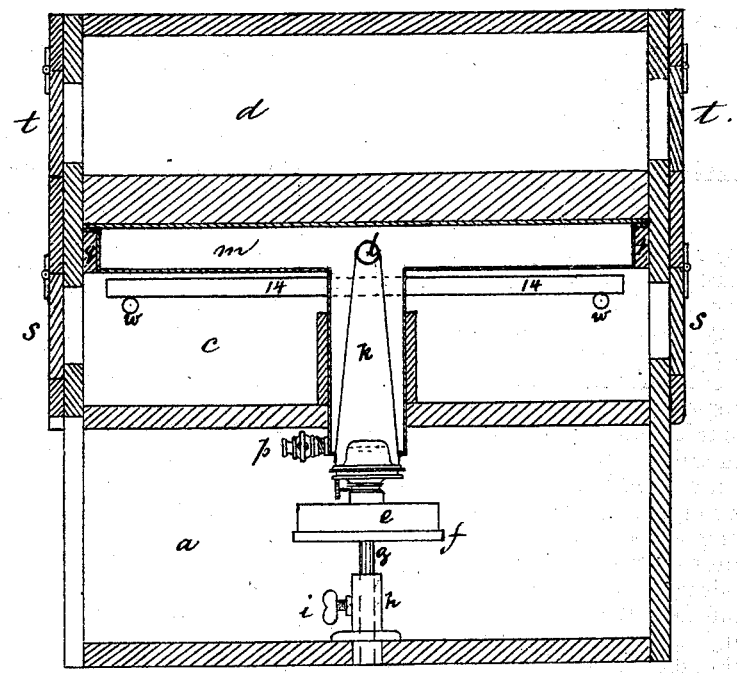
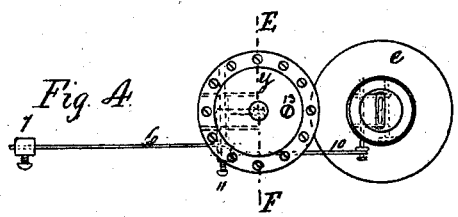
*Fig. 4*
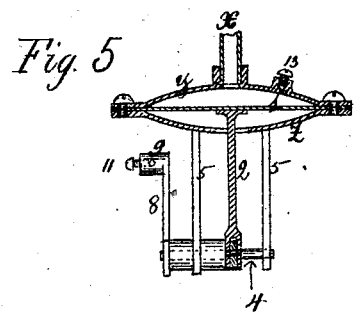
*Fig. 5*
Witnesses:—
James P. Gardner
Myron A. Pole
Inventors:—
E. Woodward and N. J. Millett
by Alban Andrén their attorney.

UNITED STATES PATENT OFFICE.

ERASTUS WOODWARD AND NATHANIEL J. MILLETT, OF CHARLESTOWN, MASS.

IMPROVEMENT IN INCUBATORS.

Specification forming part of Letters Patent No. 121,977, dated December 19, 1871.

*To all whom it may concern:*

Be it known that we, ERASTUS WOODWARD and NATHANIEL J. MILLETT, both of Charlestown, in the county of Middlesex and State of Massachusetts, have jointly invented certain new and useful Improvements on Incubators, of which the following is a specification:

The nature of our invention relates to certain new and useful improvements in incubators for hatching and brooding birds from eggs by artificial heat, consisting mainly in a new arrangement of the heating apparatus and in an automatic heat-regulator operated by the expansion or contraction of air in closed vessels, as will now be fully shown and described.

Figure 1:
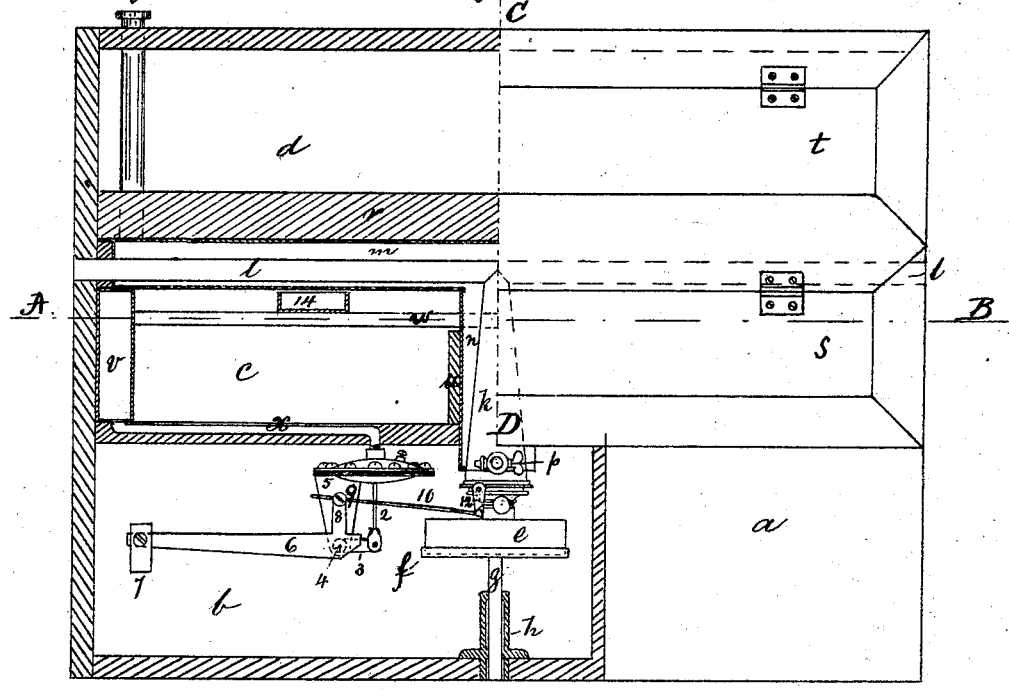
Figure 2:
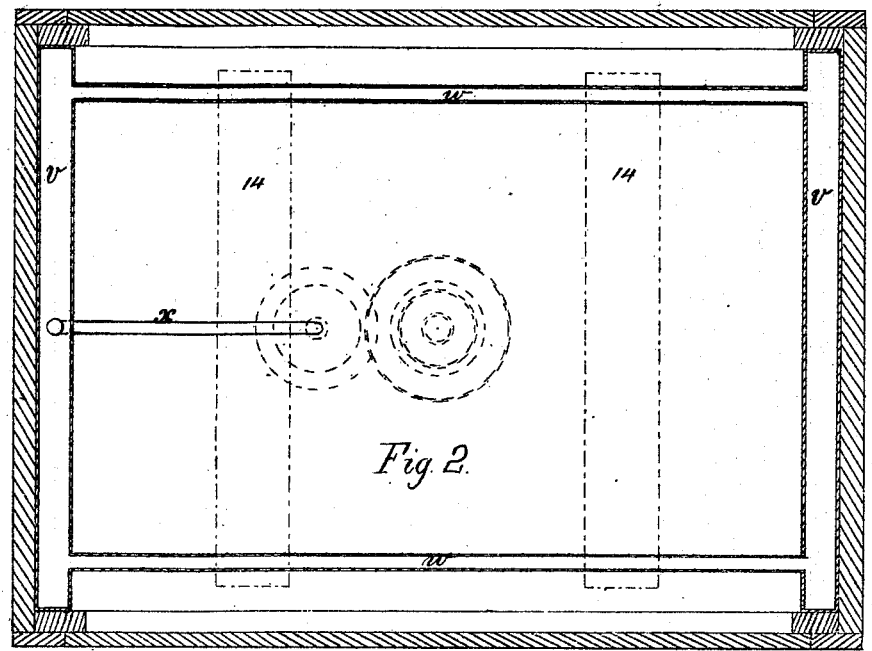

On the drawing, Figure 1 represents a central longitudinal section on the left-hand side and a front elevation on the right-hand side. Fig. 2 is a longitudinal section over the line A B taken on Fig. 1. Fig. 3 is a cross-section over the line C D, also taken on Fig. 1. Fig. 4 is a ground plan of the regulating apparatus, and Fig. 5 is an enlarged longitudinal section over the line E F taken on Fig. 4.

Similar letters refer to similar parts wherever they occur on the drawing.

The great objection made against incubators for hatching and brooding birds from eggs by artificial heat has been that a steady temperature could not be obtained during the whole time of the operation, and the result was that no birds were obtained from the eggs, and the machines failed, therefore, to give satisfaction. We have, however, after a long trial, been able to arrange a regulating apparatus that is so sensitive that it will indicate the slightest alteration in the temperature inside the apparatus, said regulating apparatus being connected to the lamp that supplies the heat, by which arrangement a steady and even temperature is obtained during the whole operation.

It has been found by long trials and practice that a temperature of 102° Fahrenheit is about the right one for raising chickens from eggs, and our regulator is so sensitive that it will feel and regulate the slightest increase or decrease above or below said temperature.

$a$ is a box, made of wood or suitable material, divided in the different stories $b$, $c$, and $d$, as shown. $b$ contains the lamp and regulator. $c$ is the hatching-room, where the eggs are laid to be hatched; and $d$ is the brooding-room, where the young birds are placed for a short time after being hatched. $e$ is a receiver for oil or suitable illuminating liquid to be used for heating the apparatus. The receiver $e$ is supported on a disk, $f$, provided on the under side with a rod, $g$, that is made to slide in a bearing, $h$, having a set-screw, $i$, whereby the rod $g$ and lamp $e$ can be kept firmly in the desired position. The burner of the lamp $e$ projects into a tapering chimney, $k$, that rises upward through the hatching-room $c$. The upper end of the chimney $k$ branches off sidewise in one or more horizontal pipes, $l\ l$, through which the heat is conducted from the lamp $e$. The object of these horizontal pipes is to absorb as much as possible of the heat before leaving the hatching-room. The pipes $l\ l$ pass through a cistern or box, $m$, that covers the whole of the hatching-room $c$, as shown. The lamp $e$ is placed in the center, or nearly so, of the apparatus, and a cylinder, $n$, surrounds the chimney $k$, and is in direct communication with the tank $m$. The tank $m$ is closed on all sides, and is filled with water as well as the cylinder $n$. From this it will be seen that the heat from the lamp $e$ is communicated quickly to the water contained in the tank $m$ and cylinder $n$. A supply-pipe, $o$, provided with a cap, leads from the top into the tank $m$, whereby the said tank can be easily filled with water. The lower end of the cylinder $n$ is also provided with a cock, $p$, by which arrangement the water from the tank $m$ and cylinder $n$ can easily be drawn off when the apparatus is not in use. The tank $m$ is provided with a flange extending all around the upper side, which flange rests upon supports $q\ q$ attached to the inside of the hatching-room $c$. A layer or layers of felt or suitable material, $r$, covers the tank $m$ and makes the floor for the brooding-room $d$, where the young birds are placed after being hatched. The rooms $c$ and $d$ are each provided with one or more doors, $s\ s\ t\ t$, that swing around hinges on the upper side. The doors $s\ s\ t\ t$ are made to shut closely against the walls of the rooms $c$ and $d$, so that no heat can escape save what is conducted through the walls. The cylinder $n$ is surrounded with a protecting wall, $u$, by which arrangement the heat from the cylinder $n$ is prevented from communicating too quickly to the eggs in the chamber $c$, as it is our desire to conduct the heat to the upper side of the eggs from the water-tank $m$, and thus, as it were, copy the natural way in which a hen sits on her eggs. We place the eggs on hay, straw, or suitable material in the chamber $c$, and keep them therein about twenty days in an even temperature of about 102° Fahrenheit.

The regulating apparatus we employ for regulating the temperature in the hatching-room is as follows: Two closed boxes, $v\ v$, containing atmospheric air, are placed, one in each end of the hatching-room $c$, as shown, and are connected together by means of pipes $w\ w$ extending the whole length of the hatching-room. A conducting-pipe, $x$, leads from one of the air-chambers $v\ v$ to the regulator, shown in section on Fig. 5. The lower end of the pipe $x$ is screwed in a hub attached to a hollowed disk, $y$. A similar disk, $z$, provided with a hole in the center, is screwed to the upper disk $y$, and an elastic diaphragm, 1, is pressed between them, as shown on Fig. 5. The diaphragm 1 is made of rubber or suitable elastic material, and is screwed air-tight against the under side of the disk $y$. A small rod, 2, projects through the central hole in the disk $z$, and has in its upper end a flange that rests against the under side of the elastic diaphragm 1. The rod 2 is forked at its lower end and connected to a crank, 3, secured to the rocking-shaft 4, supported in bearings 5 5, cast in one piece with the disk $z$. A lever, 6, is secured to one end of the shaft 4, and provided in the extreme end with an adjustable weight, 7, as shown on Fig. 1. An arm, 8, rises perpendicularly from the lever 6, which arm terminates at the top as a hub, 9, through which the connecting-rod 10 is passed and held in place by the small set-screw 11, as shown in Figs. 1 and 5. The rod 10 is connected, by means of a crank, 12, to a common "Humphrey-and-Davy" movement, by which arrangement a tube is raised or lowered around the wick-tube on a common lamp, thus decreasing or increasing the size of the flame. If gas is used instead of a lamp we attach the rod 10 to the stop-cock on the gas-pipe, whereby the same result is obtained.

The operation of this automatic regulating apparatus is as follows: After the lamp $e$ is lighted we unscrew a small stop-valve, 13, placed in the disk $y$, when the air in the boxes $v\ v$ is allowed to expand freely and pass out through the hole covered by the stop-valve 13; but as soon as we have obtained the temperature we desire to have, which is easily found by a good thermometer, we close the small stop-valve 13 in the disk $y$, and as the air in the air-boxes $v\ v$ expands by the increased heat it bulges down the elastic disk 1, whereby the rod 2 is pressed down as well as the crank 3. The crank 3, being attached to the rocking-shaft 4, rocks the said shaft, and thus raises the extreme outer end of the lever 6 and weight 7, when the arm 8 and connecting-rod 10 and crank 12 operate the Humphrey-and-Davy movement, by which arrangement the flame is decreased and the temperature consequently lowered till the pressure of the atmospheric air exceeds the pressure in the boxes $v\ v$, when the weight 7 on the lever 6 operates the arm 8, connecting-rod 10, and crank 12, whereby the Humphrey-and-Davy movement is lowered and the flame consequently increased.

By this regulating apparatus we are able to confine the variation of the temperature to 1° Fahrenheit above or below the standard temperature we desire.

If a moist atmosphere is desired in the hatching-room $c$ we place portable boxes 14 14, resting on the pipes $w\ w$, filled with water, the evaporation of which will moisten the atmosphere to any suitable degree.

Having thus fully described the nature, construction, and operation of our invention, we wish to secure by Letters Patent, and claim—

1. The combination of a flexible diaphragm, 1, with a gas or oil-lamp, to be acted upon by the expansion or contraction of air or gases, as and for the purpose set forth.

2. The arrangement of a chimney, $k$, connected to one or more horizontal flues, $l\ l$, passing through the water-tank $m$, for the purpose of increasing the heating surface of the apparatus, as herein set forth and described.

3. In combination with a flexible diaphragm, 1, the air-chambers $v\ v$, connecting-pipes $w\ w$, and the conducting-pipe $x$, for the purpose set forth.

ERASTUS WOODWARD.
NATHL. J. MILLETT.

Witnesses:
ALBAN ANDRÉN,
JAMES B. GARDNER. (116)